(12) United States Patent
Jessberger et al.

(10) Patent No.: US 8,561,761 B2
(45) Date of Patent: Oct. 22, 2013

(54) OIL PAN ARRANGEMENT OF A MOTOR VEHICLE

(75) Inventors: Thomas Jessberger, Asperg (DE); Helge Krempels, Ludwigsburg (DE)

(73) Assignee: Mann+Hummel GmbH, Ludwigsburg (DE)

( * ) Notice: Subject to any disclaimer, the term of this patent is extended or adjusted under 35 U.S.C. 154(b) by 312 days.

(21) Appl. No.: 12/499,216

(22) Filed: Jul. 8, 2009

(65) Prior Publication Data
US 2010/0006376 A1 Jan. 14, 2010

(30) Foreign Application Priority Data
Jul. 9, 2008 (DE) .................. 20 2008 009 179 U

(51) Int. Cl.
F16N 31/00 (2006.01)
F16N 33/00 (2006.01)
B65D 1/34 (2006.01)
B65D 41/06 (2006.01)

(52) U.S. Cl.
USPC ............. 184/106; 184/1.5; 220/571; 220/300

(58) Field of Classification Search
USPC ................ 184/1.5, 82, 84, 105.1, 105.3, 106; 220/231, 571, 300; 123/196 R; 200/288
See application file for complete search history.

(56) References Cited

U.S. PATENT DOCUMENTS

| 4,717,119 A * | 1/1988 | Trin .............................. 251/144 |
| 5,680,954 A * | 10/1997 | Arnold et al. ................. 220/300 |
| 6,905,040 B2 * | 6/2005 | Hilger et al. ................... 220/301 |
| 2007/0170390 A1 * | 7/2007 | Jessberger .................... 251/215 |
| 2008/0135340 A1 * | 6/2008 | Schlicker et al. ............. 184/106 |

FOREIGN PATENT DOCUMENTS

| DE | 202005004943 U1 | 7/2006 |
| DE | 102008049227 A1 | 6/2009 |

OTHER PUBLICATIONS

German patent office search of foreign priority application DE 20 2008 009 179.9.

* cited by examiner

*Primary Examiner* — William E Dondero
*Assistant Examiner* — Minh Truong
(74) *Attorney, Agent, or Firm* — James Hasselbeck

(57) ABSTRACT

The oil pan arrangement of a motor vehicle has an oil pan in particular for a gearbox as well as an oil drain plug for closing a drain opening of the oil pan. On an exterior side of the oil pan, at least one rotation stop for the oil drain plug is arranged.

7 Claims, 3 Drawing Sheets

OIL PAN ARRANGEMENT OF A MOTOR VEHICLE

CROSS REFERENCE TO RELATED APPLICATIONS

This application claims the benefit under 35 USC 119 of the filing date of foreign application DE 20 2008 009 179.9 filed in Germany on Jul. 9, 2008, the contents of which are incorporated herein by reference in its entirety.

BACKGROUND OF THE INVENTION

The invention concerns an oil pan arrangement of a motor vehicle.

In known embodiments of an oil pan arrangement the oil pan is comprised of steel wherein the drain opening of the oil pan has an inner thread. An oil drain plug in the form of an oil drain screw is screwed into this inner thread. When doing so, an intermediately positioned copper seal is compressed in order to ensure the required seal-tightness. For tightening the oil drain screw a tightening torque is prescribed in order to prevent destruction of the thread. The usual torque is in a range of 20 Nm to 40 Nm.

In case of materials of the oil pan that are not as strong, for example, in embodiments of aluminum or in case of gear oil pans or motor oil pans made of plastic material, an even smaller torque is prescribed for protecting the thread; in case of plastic oil pans it is in the range of approximately 8 Nm. When servicing work is done, it can happen that the oil drain screw is not properly tightened. For example, when no torque wrench is used, it may happen that the thread in the oil pan is damaged or even torn from the oil pan. This leads to leakage or even to the oil pan becoming unusable.

DE 20 2005 004 943 U1 discloses a closure lid for openings at motor vehicle engines; the lid is provided radially on the circumferential area with a rotation stop and/or a locking stud. As a result of the radial arrangement not having an axial projection length, the rotary angle of the closure lid relative to the container can be recognized only with difficulty and a sealing action cannot be reliably ensured.

The invention has the object to further develop an oil pan arrangement of the aforementioned kind in such a way that a permanent seal-tightness in the area of the drain opening is ensured.

SUMMARY OF THE INVENTION

This object is solved in that an oil pan arrangement is thus proposed in which on the exterior side of the oil pan at least one rotation stop is arranged. The oil drain plug inserted and tightened by rotary movement impacts upon tightening by rotary movement on the rotation stop. This can be sensed by the operator without any special tool and can be understood as a signal that the oil drain plug has reached its operating position in which it closes and seals the drain opening. Also, the operator can screw in the oil drain plug manually without tool "by feel" without requiring visual contact with the screw-in area of the oil drain plug. Since moreover the rotation stop arranged on the exterior side of the oil pan is visible and also can be haptically sensed by the operator, an additional visual or haptic control is possible by means of which the operator upon contact on the rotation stop recognizes the closed rotary position of the oil drain plug. Also, for a possible contamination of the oil pan in the area of the oil drain plug or in case of bad visual conditions, for example, darkness, it is avoided in this way that the oil drain plug may be rotated past the sensed stop which would lead to damage or destruction of the oil pan. Faulty handling of the oil drain screw causing oil leakages is reliably prevented. By means of an additional locking device for fixation of the oil drain plug an accidental detachment is prevented.

As a rotation stop, various suitable positive-locking measures are conceivable. Preferably, an exterior head of the oil drain plug has at least one and preferably two stop surfaces extending in the radial and axial direction; they each have correlated therewith a rotation stop extending in the axial direction of the oil drain plug on the exterior side of the oil pan away from the exterior side. The afore defined stop surfaces are positioned perpendicularly to the circumferential or rotational direction of the oil drain plug so that a minimal surface pressure is generated upon contacting the correspondingly embodied rotation stops. Even for soft materials such as light metal and in particular plastic material a permanent load-bearing capacity is ensured. Moreover, the contact provides a precisely defined rotary angle position of the oil drain plug so that overwinding is avoided. The arrangement of at least two contact surfaces and rotation stops leads also to a load distribution and avoidance of canting.

In a preferred embodiment, at least one rotation stop in the mounted state of the oil drain plug projects in its axial direction past the head. The rotation stop thus takes on a safety function for the oil drain plug and its securing action in the oil pan relative to outer mechanical actions. For example, the motor may be placed in the dismounted state e.g. onto the ground without the oil drain plug or its receptacle in the oil pan being mechanically loaded.

It can be expedient to configure the oil drain plug with a bayonet closure or as an oil drain screw with a thread. In a preferred embodiment, a slider-block guide is provided for the oil drain pipe that, in the circumferential direction of the oil drain plug, has a locking groove. Preferably, at the inlet side of the locking groove and in particular between an axial insertion groove and the locking groove a slanted groove extending in the axial direction and the circumferential direction is arranged. The insertion groove extending in the axial direction facilitates initially the axial insertion of oil drain plug into the drain opening into the prescribed sealing position. The slanted groove assists in case of a rotary movement the axial threading of the oil drain plug into the drain opening for which purpose however only a minimal rotary angle is required. The locking groove extending in the circumferential direction does not cause a further axial tightening action upon rotation of the oil drain plug but only leads to the locking position being reached. In this way only a minimal rotary angle is needed. There is a separation of axial insertion movement and rotary locking movement. Upon axial insertion the rotation stops are not in the way but during the following rotary movement perform their function as a rotary angle limiter without any limitation. It can be expedient to form the aforementioned grooves in the wall of the drain opening. Preferably, the reverse arrangement is however chosen in which the slanted groove, the locking groove, and optionally also the insertion groove are provided on the oil drain plug while at least one guide pin of the oil pan engages the aforementioned groove. In this way, a higher load-bearing capacity is provided while the manufacture is simple.

It can be expedient to provide an axial seal between the oil drain plug and a sealing surface of the oil pan. Advantageously, the oil drain plug has a radial seal which in the mounted state rests with radial sealing action on a sealing surface of the drain opening which sealing surface is in particular cylindrical. The radial seal provides already upon axial insertion of the oil drain plug the desired sealing action. An axial tightening is not required for the sealing action. The rotary movement causing the locking action can be realized without great force expenditures so that the holder for the oil drain plug is only minimally loaded.

In a preferred further embodiment, in the area of the drain opening a locking device is provided for fixation of the oil drain plug in its closed position. The rotation stops exert their function only upon insertion of the drain plug. In running operation the locking device prevents reliably that the oil drain plug will become detached accidentally.

The embodiment according to the invention can be employed in any type of oil pan of any material. The advantages however are apparent in particular in an embodiment of the oil pan of soft materials such as a light metal and in particular plastic material. The soft minimally loadable material of the oil pan is only minimally loaded upon insertion and tightening of the oil drain plug. Despite the minimal load-bearing capacity of the material overloading is reliably prevented and the oil seal-tightness is permanently ensured.

The embodiment according to the invention can be employed in connection with any type of oil drain plug of any material. The advantages however are apparent in particular in an embodiment of the oil drain plug of soft materials such as a light metal and in particular plastic material. The soft material of the oil drain plug is only minimally loaded upon insertion and tightening as a result of the rotation stops. Despite the minimal load-bearing capacity of the material, overloading is reliably prevented and the oil seal-tightness is permanently ensured.

In a preferred embodiment, the head of the drain plug has a multi-tool receptacle comprising in particular an external hexagon, an internal hexagon, an internal TORX and/or a cross recess. In connection with the system-caused minimal actuation forces, the oil drain plug, with elimination of special tools, can be mounted with various tools that are currently available. Damage to the oil drain plug by use of wrong or improper tools is prevented.

In an alternative embodiment, the head of the drain plug has a locking handle that enables mounting of the drain plug by hand without a tool. This is particularly advantageous when no tool is available or the mounting site of the drain plug is not accessible by tools.

BRIEF DESCRIPTION OF THE DRAWINGS

Embodiments of the invention will be explained in the following with the aid of the drawings in more detail.

PREFERRED EMBODIMENTS OF THE INVENTION

Figure 1:
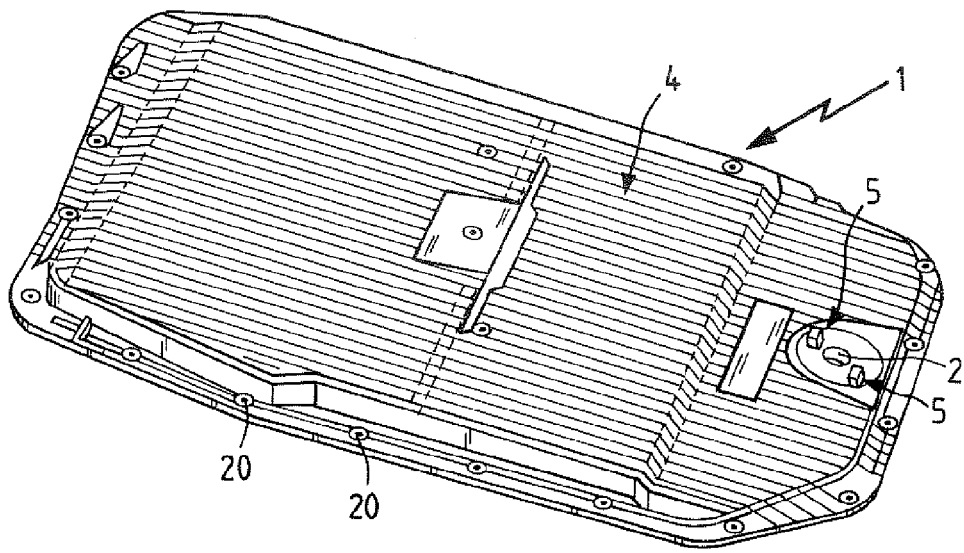
FIG. 1 shows in a perspective view from below a plastic oil pan according to the invention with rotation stops for the oil drain pipe that are externally positioned and project away from the exterior surface of the oil pan.

FIG. 1 shows in a perspective view from below an oil pan 1 of a motor vehicle which oil pan is embodied according to the present invention. The oil pan 1 may be that of an internal combustion engine. FIG. 1 shows an oil pan 1 for a gearbox of a motor vehicle. As a material for the oil pan 1 any material and in particular light metal such as die cast aluminum are conceivable. In the illustrated embodiment plastic material, e.g., polyamide, is chosen. On its exterior side 4 the oil pan 1 is provided with a rib structure for stiffening and as a rock impact protection. In case of a rock impacting on the oil pan 1 or in case of the vehicle hitting the ground with the oil pan or in case of placing the engine in a service situation on the oil pan, these ribs absorb a portion of the energy without the oil pan being damaged. On its circumferential area a plurality of metal-reinforced screw holes 20 is arranged by means of which the oil pan 1 is screwed onto the gearbox, not illustrated. The oil pan 1 has a drain opening 2 through which, as needed, oil may be drained and which, in operation, is closed off by an oil drain plug 3 illustrated in the following Figures.

External to the drain opening 2 in the radial direction, at least one rotation stop 5 is arranged on the exterior side 4 of the oil pan 1 and projects away from the exterior side of the oil pan; the rotation stop 5 is visible by the operator when looking at the exterior side 4. In the illustrated embodiment, a total of two rotation stops 5 are provided that relative to the drain opening 2 are positioned opposite one another. However, a greater number of rotation stops 5 that are preferably uniformly distributed about the circumference of the drain opening may be expedient. The rotation stops 5 can be manufactured as separate parts and can be attached to the exterior side 4 of the oil pan 1. In the illustrated embodiment, they are configured as an integral part of the oil pan 1.

Figure 2:
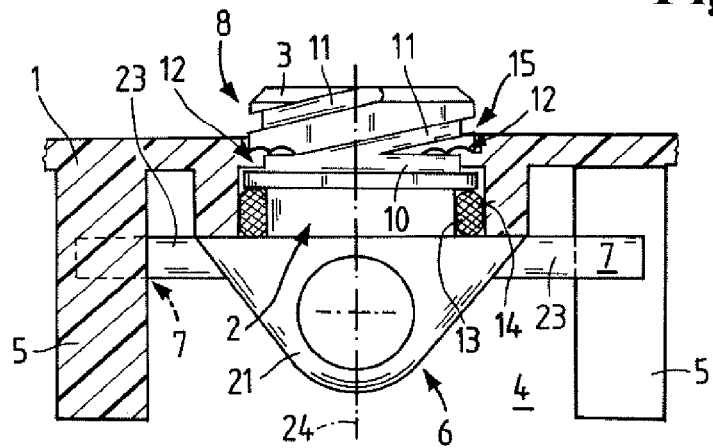
FIG. 2 shows in a schematic longitudinal section view the arrangement according to FIG. 1 in the area of the drain opening with inserted oil drain plug rotated against the rotation stops and with a locking handle for mounting by hand without a tool.

FIG. 2 shows in schematic longitudinal section illustration the arrangement according to FIG. 1 in the area of the drain opening 2. The drain opening 2 is closed off by an inserted oil drain plug 3. The oil pan 1 forms together with the oil drain plug 3 the oil pan arrangement according to the invention. The drain opening 2 passing through the bottom of the oil pan 1 is substantially cylindrical and has at its area facing the exterior side 4 a cylindrical sealing surface 14. The oil drain plug 3 is embodied in its area engaging the drain opening 2 substantially of rotational symmetry relative to an axis of rotation 24 and supports on its circumferential surface a radial seal 13 which, in the illustrated mounted state, rests seal-tightly against the sealing surface 14 in the radial direction.

The oil drain plug 3 may be embodied as an oil drain screw with a thread. Alternatively, it can be expedient to provide a bayonet closure for attachment of the oil drain plug 3 in the drain opening 2. In the illustrated embodiment, as a holder for the oil drain plug 3 a slider-pin guide 8 is provided. It comprises two diametrically opposed guide pins 12 that relative to the axial direction are arranged inwardly of the sealing surface 14 and that project in the radial direction from the exterior to the interior into the drain opening 2. At its end that relative to the axial direction is facing the interior of the oil pan 1, i.e., on the inner side relative to the radial seal 13, the oil drain plug 3 is provided with a locking groove 10 that is a part of the slider-pin guide 8 and extends continuously or uninterrupted in the circumferential direction. Starting at the correlated free end of the drain plug 3 two slanted grooves 11 are provided that extend in the axial direction and in the circumferential direction in a screw shape, that open into the locking groove 10, and that are also a part of the slider-pin guide 8.

For manipulation, the oil drain plug 3 has on its end that is facing the exterior side 4 a head 6 which in the illustrated embodiment is embodied as a manually actuatable locking handle 21. The oil drain plug 3 can be gripped by hand at the locking handle 21, can be inserted into the drain opening 2 and rotated. For assisting this action, the locking handle 21 is provided with a hole through which a tool, for example, in the form of a screwdriver may be passed.

Figure 3:
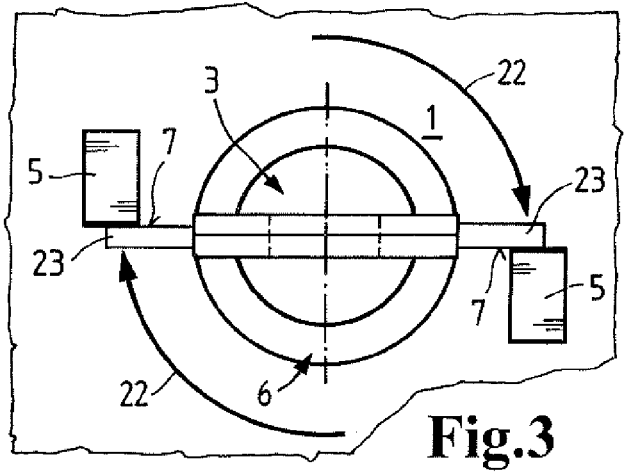
FIG. 3 shows a plan view of the arrangement according to FIG. 2 with further details in regard to the function of the rotation stops.

FIG. 3 shows a plan view onto the arrangement according to FIG. 2. When looking at FIGS. 2 and 3, the head 6 of the oil drain plug 3 has two radially projecting arms 23 that are diametrically opposed to one another and form stop surfaces 7 that extend in the radial direction and in the axial direction. Each of these stop surfaces 7 has correlated therewith a rotation stop 5. It is also possible to provide a different number of stop surfaces 7 and rotation stops 5. For mounting, the oil drain plug 3 is first inserted in the direction of the axis of rotation 24 axially into the drain opening 2 wherein the guide pins 12, by rotation of the drain plug 3 about the axis of rotation 24, are brought into engagement with the correlated slanted grooves 11. A further rotation of the drain plug 3 about the axis of rotation 24 in the direction of arrows 22 causes as a result of the interaction of the guide pins 12 with the slanted grooves 11 the oil drain plugs 3 to be pulled in axially into the drain opening 2 to such an extent that the guide pins 12 come to rest in the circumferentially extending locking groove 10. Since the circumferentially extending locking groove 10 has no incline, a further rotation of the oil drain plug 3 does not cause any further axial movement. The oil drain plug 3 is however secured against sliding out in the axial direction by engagement of the guide pins 12 in the locking groove 10.

Because of the embodiment of the locking groove 10 as a circumferentially continuously and uninterruptedly extending groove, the guide pins 12 do not cause any impairment of the rotary movement. An automatic rotation of the oil drain plug 3 is prevented by a locking device 15 in the area of the locking groove 10 in connection with the clamping forces at the radial seal 13. For configuring the locking device 15, the guide pins 12 in the illustrated embodiment are of a springy embodiment in the radial direction and engage in locking recesses of the groove wall of the circumferentially extending locking groove 10. However, a different embodiment of the locking device 15 may be expedient.

In the rotary direction that is identified by arrows 22 the rotational movement of the oil drain plug 3 is delimited by contacting the stop surfaces 7 of the correlated rotation stops 5. An overwinding of the oil drain plug 3 is prevented in the rotary direction that is indicated by arrows 22.

The illustration according to FIG. 2 also shows that the rotation stops 5 in the mounted state of the oil drain plug 3 project past the head 6 of the oil drain plug 3 in the axial direction, i.e., in the direction of the rotary axis 24. In this way, the oil drain plug 3 including the slider-pin guide 8 or another type of holder of the oil drain plug 3 in the oil pan 1 is protected from external mechanical actions.

Figure 4:
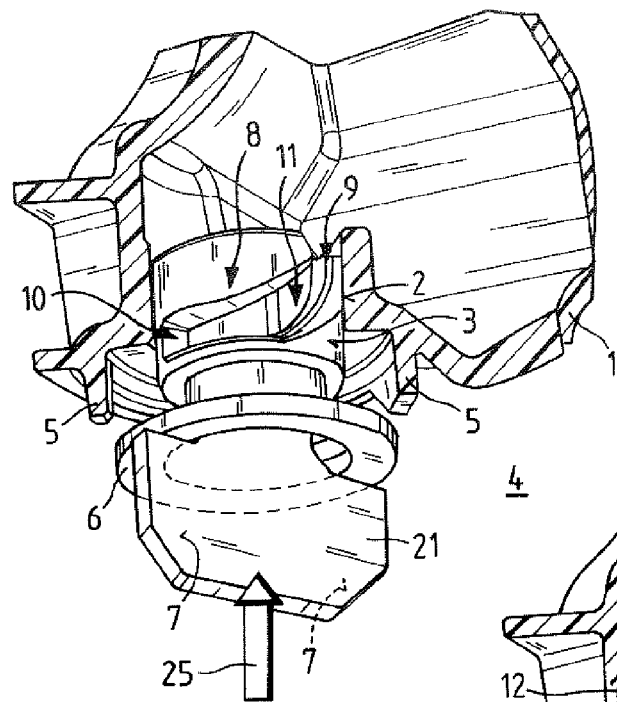
FIG. 4 shows in a perspective section view a further embodiment of the invention with oil drain plug that has been axially inserted halfway.
Figure 5:
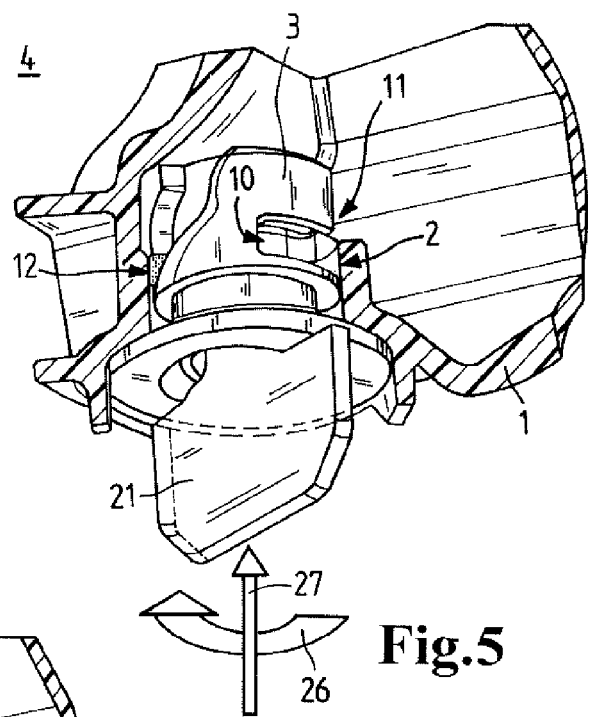
FIG. 5 shows the arrangement according to FIG. 4 with axially completely inserted oil drain plug that has been rotated about halfway into the closed position.
Figure 6:
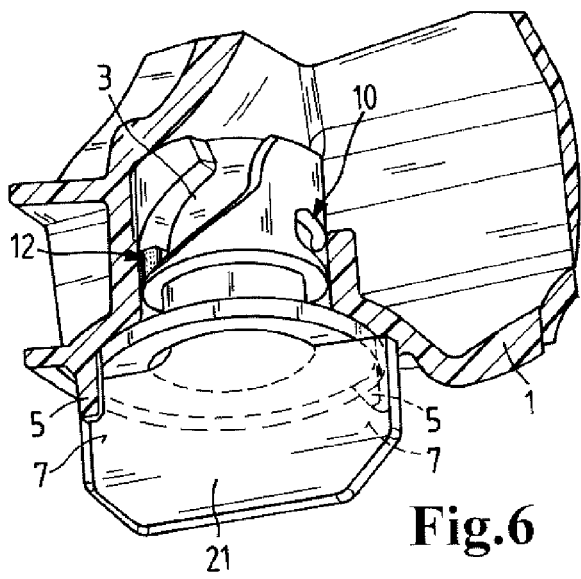
FIG. 6 shows the arrangement according to FIGS. 4 and 5 with the oil drain plug completely rotated in the closing direction against the two rotation stops.

FIGS. 4 to 6 show in perspective section illustration a further embodiment of the invention wherein the stop surfaces 7 are not formed by arms (FIGS. 2, 3) but by a head having a T-shaped locking handle 21 arranged on an outwardly facing side of the circular portion 6 of the head 6 with the T-shaped handle (21) extending axially outwardly from the circular portion of the head 6.

The slider-pin guide 8 is formed by axially extending insertion grooves 9, locking grooves 10 extending in the circumferential direction, as well as intermediately positioned slanted grooves 11. The axial insertion groove 9 opens by means of the intermediately positioned slanted groove 11 into the locking groove 10 extending in the circumferential direction that extends across a limited circumferential angle area.

According to FIG. 4, the oil drain plug 3 is inserted in the axial direction in accordance with arrow 25 wherein the guide pins 12 engage the correlated axial insertion groove 9 and reach the beginning of the slanted groove 11. Subsequently, in accordance with the illustration of FIG. 5 a rotation of the oil drain plug 3 in accordance with arrow 26 is realized wherein the interaction of the guide pins 12 with the respective slanted groove 11 causes a further axial pulling of the oil drain plug 3 into the drain opening 2 in accordance with arrow 27 until the guide pins 12 engage the respective locking groove 10 extending in the circumferential direction. A further rotation of the oil drain plug 3 in the direction of arrow 26 does not cause a further pulling in of the oil drain plug 3 into the drain opening 2 because the locking groove 10 is not inclined. In accordance with the illustration of FIG. 6, as a result of engagement of the guide pins 12 in the respective locking groove 10 only an axial fixation of the drain plug 3 is realized.

In the illustration according to FIG. 6 it can also be seen that the rotary movement of the oil drain plug 3 in the closing direction indicated by arrow 26 (FIG. 5) is limited by contacting the stop surfaces 7 at the rotation stops 5. The guide pins 12 are still located at a distance to the end of the locking grooves 10 so that as a result of the rotary movement they cannot be overloaded. In respect to other features and reference characters, the arrangement according to FIGS. 4 to 6 coincides with that of the FIGS. 1 to 3.

Figure 7:
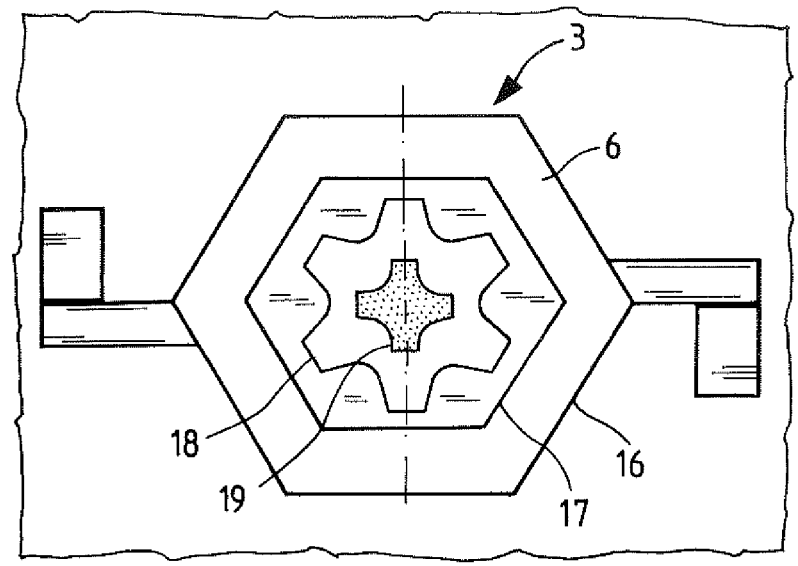
FIG. 7 shows in a plan view a variant of the oil drain plug with a multi-tool receptacle.

In FIG. 7 a schematic plan view of a further variant of the oil drain plug 3 is shown wherein its head 6 has instead of the afore described locking handle 21 a multi-tool receptacle. This multi-tool receptacle comprises in the illustrated embodiment an external hexagon 16, an internal hexagon 17, an internal TORX 18, and a cross recess 19. However, it can also be expedient to provide only a selection of the aforementioned means for attaching tools or to provide alternatively or additionally further forms of such means.

Figure 8:
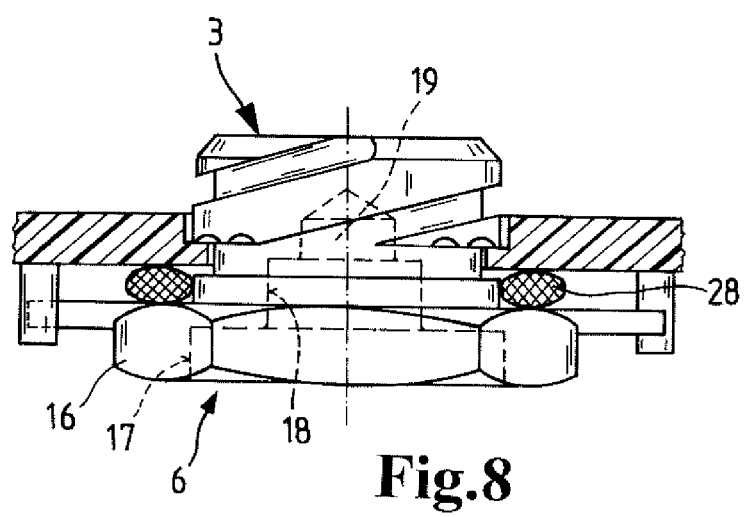
FIG. 8 shows in a longitudinal section illustration the arrangement according to FIG. 7 with further details of the oil drain plug and its multi-tool receptacle.

FIG. 8 shows in longitudinal section the arrangement according to FIG. 7 with further details of the drain plug 3 and of a multi-tool receptacle. The dashed-line illustration shows that the internal hexagon 17, the internal TORX 18 and the cross recess 19 are embodied to be stepped in the depth direction. The internal hexagon 17 with greatest engagement width has a reduced penetration depth within the head 6 in comparison to the internal TORX 18 of smaller diameter. The greatest penetration depth is provided for the cross recess with still smaller diameter. In this way, all tool receptacles can be used alternatively without impairing one another. The illustration of FIG. 8 also shows that alternatively to the illustration of the radial seal 13 of FIG. 2 an axial sealing ring 28 may be provided. With respect to other features and reference characters, the embodiment according to FIG. 7 and 9 coincides with that of the other Figures.

While specific embodiments of the invention have been shown and described in detail to illustrate the inventive principles, it will be understood that the invention may be embodied otherwise without departing from such principles.

What is claimed is:

1. An oil pan arrangement of a motor vehicle, comprising an oil pan (1), in particular for a gearbox, as well as an oil drain plug (3) for closing a drain opening (2) of the oil pan (1), wherein on an exterior side (4) of the oil pan (1) at least one rotation stop (5) for the oil drain plug (3) is arranged, wherein said oil drain plug is rotatable within said drain opening (2) about an axis of rotation (24), said axis of rotation (24) defining an axial direction;

wherein said oil drain plug includes a slider guide pin (8) comprising a locking groove (10) extending in a circumferential direction of the oil drain plug, a head (6) including a circular head portion arranged on an axially exterior end of said drain plug;

a T-shaped handle (21) arranged on an axially outward facing side of said circular head portion, said T-shaped handle extending axially outwardly from said circular head portion, said T-shaped handle (21) extending in a radial direction of said oil drain plug outwardly beyond circular head portion, wherein at least one stop surface is arranged on said T-shaped handle axially outwardly of said circular head portion and radially outwardly of said circular head portion, each of said at least one stop surfaces correlated with a respective one of said at least one rotational stop (5), wherein said at least one stop surface is arranged only axially outwardly of said circular head portion, wherein said at least one rotation stop (5) projects axially outwardly from said oil pan exterior side (4) in said axial direction of said circular head portion of said oil drain plug and continuing outwardly beyond said circular head portion to engage said at least one stop surface, wherein said oil pan includes at least one guide pin (12) projecting from said oil pan in a radial direction inwardly into said drain opening (2).

2. The oil pan arrangement according to claim 1, wherein at an inlet of the locking groove (10) between an axial insertion groove (9) and the locking groove (10) a slanted groove (11) is arranged that extends in the axial direction and in the circumferential direction.

3. The oil pan arrangement according to claim 2, wherein the locking groove (10), the insertion groove (9), and the slanted groove (11) are arranged on the oil drain plug (3) and are engaged by at least one guide pin (12) of the oil pan (1).

4. The oil pan arrangement according to claim 1, wherein the oil drain plug (3) has a radial seal (13) that in the mounted state rests sealingly in a radial direction against a cylindrical sealing surface (14) of the drain opening (2).

5. The oil pan arrangement according to claim 1, wherein the oil pan (1) is made of a polyamide plastic material.

6. The oil pan arrangement according to claim 1, wherein the oil drain plug (3) has a head (6) with a manually actuated locking handle (21) at the end of the oil drain plug that is facing the exterior side (4).

7. The oil pan arrangement according to claim 1, wherein the oil drain plug (3) is comprised of a polyamide plastic material.

\* \* \* \* \*